US009042389B2

(12) United States Patent
Gupta et al.

(10) Patent No.: US 9,042,389 B2
(45) Date of Patent: May 26, 2015

(54) MULTI-ACCESS COMMUNICATIONS GATEWAY

(75) Inventors: Sujay Gupta, Kolkata (IN); Amitabha Das, Bangalore (IN)

(73) Assignee: Infosys Limited, Bangalore (IN)

( * ) Notice: Subject to any disclaimer, the term of this patent is extended or adjusted under 35 U.S.C. 154(b) by 413 days.

(21) Appl. No.: 13/111,286

(22) Filed: May 19, 2011

(65) Prior Publication Data

US 2012/0257633 A1    Oct. 11, 2012

(30) Foreign Application Priority Data

Apr. 7, 2011   (IN) .......................... 1202/CHE/2011

(51) Int. Cl.
*H04L 12/28* (2006.01)
*H04M 15/00* (2006.01)
*H04L 29/06* (2006.01)
*H04L 12/14* (2006.01)

(52) U.S. Cl.
CPC ........ *H04L 12/2834* (2013.01); *H04L 12/2898* (2013.01); *H04L 12/145* (2013.01); *H04M 15/80* (2013.01); *H04M 15/8044* (2013.01); *H04L 69/14* (2013.01)

(58) Field of Classification Search
None
See application file for complete search history.

(56) References Cited

U.S. PATENT DOCUMENTS

| 6,430,607 | B1 * | 8/2002 | Kavner ........................ 709/217 |
| 6,504,844 | B1 * | 1/2003 | Keller-Tuberg ............... 370/397 |
| 6,798,769 | B1 * | 9/2004 | Farmwald ..................... 370/352 |
| 8,824,487 | B1 * | 9/2014 | Ray ............................. 370/401 |
| 2004/0004968 | A1 * | 1/2004 | Nassar ......................... 370/401 |
| 2004/0146072 | A1 * | 7/2004 | Farmwald ..................... 370/537 |
| 2006/0126613 | A1 * | 6/2006 | Zweig .......................... 370/389 |
| 2008/0279202 | A1 * | 11/2008 | Choi et al. .................... 370/401 |
| 2011/0170554 | A1 * | 7/2011 | De Smedt et al. ............ 370/401 |
| 2011/0208843 | A1 * | 8/2011 | Johansson et al. ............ 709/220 |
| 2013/0142081 | A1 * | 6/2013 | Nimon et al. ................. 370/255 |

FOREIGN PATENT DOCUMENTS

EP      2166726   A1 *   3/2010   ............. H04L 29/06

OTHER PUBLICATIONS

Srisuresh et al., "Traditional IP Network Address Translator (Traditional NAT)", RFC 3022, Jan. 2011.*

* cited by examiner

*Primary Examiner* — Ayaz Sheikh
*Assistant Examiner* — Peter Chau
(74) *Attorney, Agent, or Firm* — Marc S. Kaufman; Stephen M. Hertzler; Reed Smith LLP

(57) ABSTRACT

A gateway which provides network connectivity via network service providers. A method and apparatus can integrate the various connectivity options provided by multiple service providers and present to the user a single point of connectivity. Having more than one way of network connectivity may provide the following additional services: Link Aggregation (to increase bandwidth), Redundancy and ancillary services like TOD (time-of-day) based smart usage (to reduce costs). The access medium may be wired technologies like Cable, DSL, Fiber to wireless 4G technologies. These options may offer various link speeds, latency, reliability and cost structures. The embodiments integrate the various connectivity options provided by multiple service providers and present to the user a single point of connectivity.

22 Claims, 3 Drawing Sheets

MULTI-ACCESS COMMUNICATIONS GATEWAY

RELATED APPLICATION DATA

This application claims priority to Indian Pate nt Application No. 1202/CHE/2011, filed Apr. 7, 2011, which is hereby incorporated by reference in its entirety.

BACKGROUND

Computer network communications gateways, such as Residential Gateways (RG) for home internet users, are serviced and provided by one Internet Service Provider. These RGs often provide multiple services like voice and video along with data. The last mile access connectivity option for an RG uses various mechanisms such as copper wire, optical fiber or wireless communications, depending upon the ISP's capabilities and services.

A residential gateway is a home networking device that connects computing devices in the home to the Internet or other network. Examples of devices that function as residential gateways are various multi-function networking computer appliances used in homes, which may include a DSL modem or cable modem, a network switch, providing LAN switching, a consumer-grade router, and a wireless access point. In the past, such functions were provided by separate devices. However, newer devices merge many of these functions into a single device.

A conventional RG provides a host of services, ranging from simple data services to multiple play services where data services are bundled with other complex data services like voice and video. Data services are offered at different speeds and pricing models. However, with a conventional RG, the user is bound by a single service provider's offerings, even though there may exist cheaper and/or better data services offerings from competitive service providers. A user could have multiple RGs and multiple service providers, one for each RG, of course. However, selecting a service provider for a user device would require rerouting physical connections or pairing wireless connections between the device and the desired RG. Also, a user could not readily determine which service provider is advantageous for a specific time or task.

Further, the RG and its Service Provider provide a single point of failure for internet connectivity. In the event the user has multiple internet connectivity options, there is no methodology for aggregating the individual bandwidths to get a higher throughput. There may be instances when a Service Provider has more than one access technology available, but there is no provision to offer them simultaneously to the customer in redundancy mode or in a cost-effective structured mode.

Figure 1:
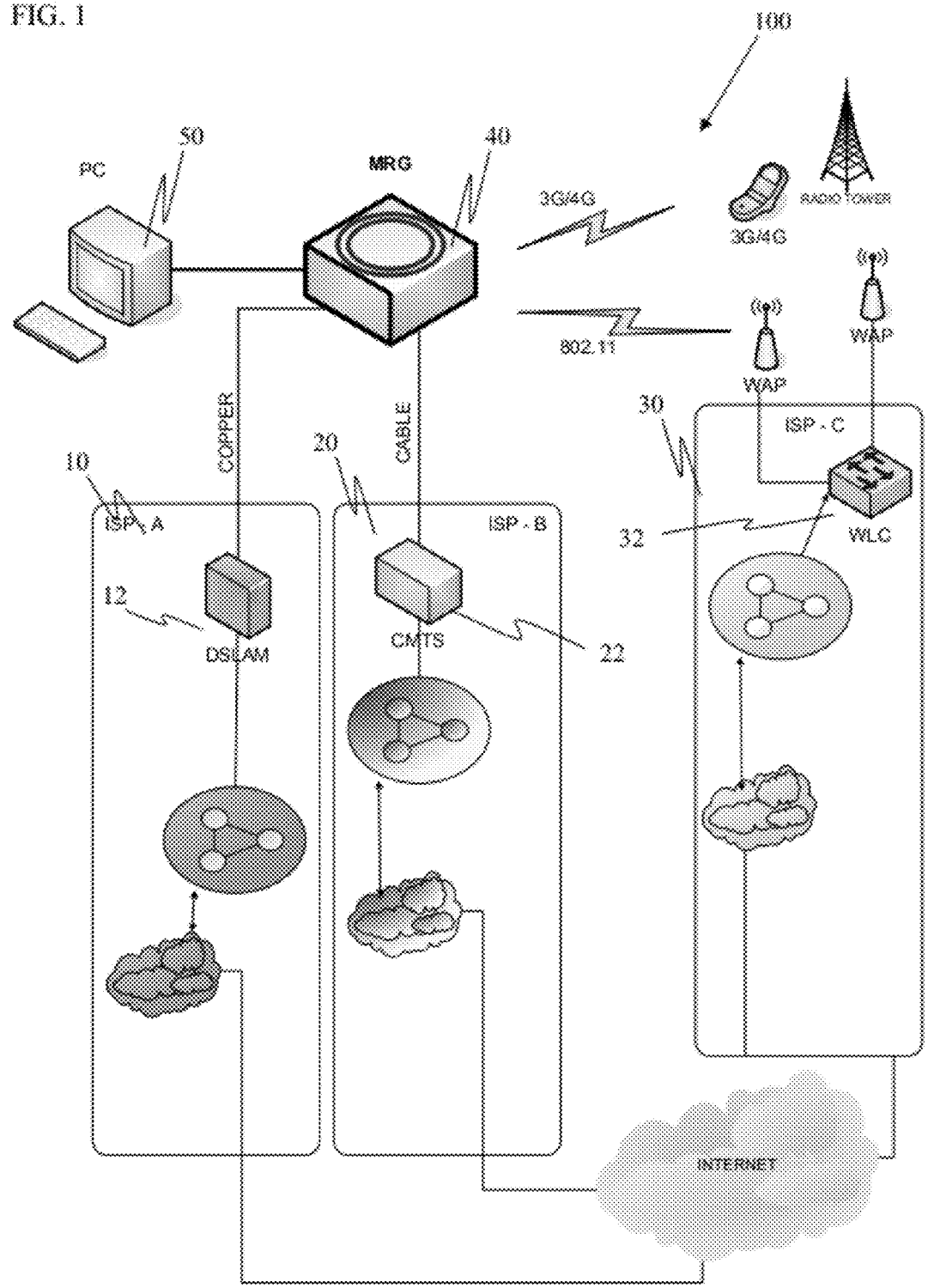
FIG. 1 is a schematic diagram of a network deployment architecture in accordance with an embodiment.

While systems and methods are described herein by way of example and embodiments, those skilled in the art recognize that the invention is not limited to the embodiments or drawings expressly described herein. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The embodiments described herein provide for multiple network communication access technologies, i.e. channels, which may be used simultaneously or singularly so that the user can access data services from multiple service providers. This provides greater cost-effectiveness and better levels of service without the need to change the user's internal network connection. The embodiments provide redundant internet connectivity channels, increasing reliability and availability. The individual channel bandwidths can be aggregated across different access technologies. The service provider can simultaneously use more than one channel to reach the user.

Residential internet users benefit by having a cost effective internet access and link bandwidth aggregation or redundancy. Incumbent Local Exchange Carriers (ILECs) who have existing infrastructure benefit by the ability to leverage new technologies, such as wireless technologies, in addition to more traditional technologies in which they have already invested.

Typically, a residential user of computer network services, such as internet services, has one primary service provider connection. However, there is a great deal of competition amongst Internet Service Providers (ISPs) and thus other service providers may offer a less expensive option or may provide a better level of service. As an example these options may be available as ready-to-use 2G/3G/4G data services on mobile devices, Community Wi-Fi free services, or other options. The disclosed embodiments can maintain the primary service channel while also permitting the user to easily use other available service provider channels. The embodiments provide the following advantages for a residential user:

Redundant connection—The embodiment will maintain Internet connectivity even in the case of temporary outage of the primary or other connection options, using one or a combination of the other available connectivity options.

Smart Connectivity—The embodiment may be tuned to use different connectivity options depending upon rate-plan, time-of-day or user-application service level requirements or other communications parameters.

Bandwidth Aggregation—The embodiment can use simultaneously multiple connections, and thus aggregate the bandwidth provided by multiple service options and present it to the user. As an example, the embodiment can aggregate a primary DSL link with a local Wi-Fi connection, and present the entire combined bandwidth for user consumption.

The embodiments provide the following benefits for the network service provider:

Increased service option and coverage—Internet Service Providers often have multiple data-service offerings. As an example a service provider may have wireless data services using handheld devices, and at the same time it may provide broadband connectivity using fiber or copper to the home. These service providers can deploy the embodiments and provide Internet connectivity utilizing either the wireless services and/or fixed-line connection to manage their network and thus minimize cost and increase their serviceable area.

Better services by leveraging new technology—Incumbent service providers are seen to have already invested in Broadband wireless licenses, and at the same time, they do not want to dispose the existing copper/fiber last mile connectivity. Using the embodiment, the Service Provider can leverage the existing connection and still use newer access channels to offer better service to the customer.

FIG. 1 illustrates a network service architecture 100. ISP 10 provides network connectivity, such as internet connectivity, to a residential user over DSL links. ISP 20 provides network connectivity, such as internet connectivity, to a residential user over cable. ISP 30 provides network connectivity, such as internet connectivity, to a residential user through wireless data services, such as a 3G mobile device network. Multi-Access Residential Gateway (MRG) 40 can be located at the position of an existing RG, such as inside the user's home. A residential user accesses the above-noted services through host computer 50, such as a PC or another computing device, such as a tablet computer. Note that there can be more than one host computer 50, such as a laptop, desktop, tablet, or other computing device, coupled to MRG 40 as described in greater detail below. Only one host computer 50 is shown in FIG. 1 for simplicity.

As is well known, ISP 10 supports and manages a network including Digital Subscriber Line Access Multiplexer (DSLAM) 12, which allows telephone lines to make faster connections to the Internet. DSLAM 12 is a network device, located in the telephone exchanges of ISP 10, that connects multiple customer Digital Subscriber Lines (DSLs) to a high-speed Internet backbone line using multiplexing techniques.

As is also well known, ISP 20 supports and manages a network including cable modem termination system (CMTS) 22. CMTS 22 is a piece of equipment typically located in a cable company's headend or hubsite, and used to provide high speed data services, such as cable Internet or voice over Internet Protocol, to cable subscribers. CMTS 22 provides many analogous functions with respect to DSLAM 12.

As is also well known, ISP 30 supports and manages a network including Wireless LAN Controller (WLC) 32. WLC 32 is a piece of equipment that serves as a wireless interface to various clients thus providing many analogous functions with respect to DSLAM 12.

MRG 40 can provide multiple access adapters like a DSL modem, a cable modem, a Wi-Fi Card, and a pluggable USB 3G/4G data card, for example, as described in greater detail below. Each of these adapters/services can be served by different service providers. For example, a user may have service provider A for DSL service and service provider B for 3G service. MRG 40 can obtain or maintain a different IP address, Gateway, and DNS for each of the different connectivity options. The host side of MRG 40, however, can function assuming a single point of connection to the internet in the manner described below.

Figure 2:
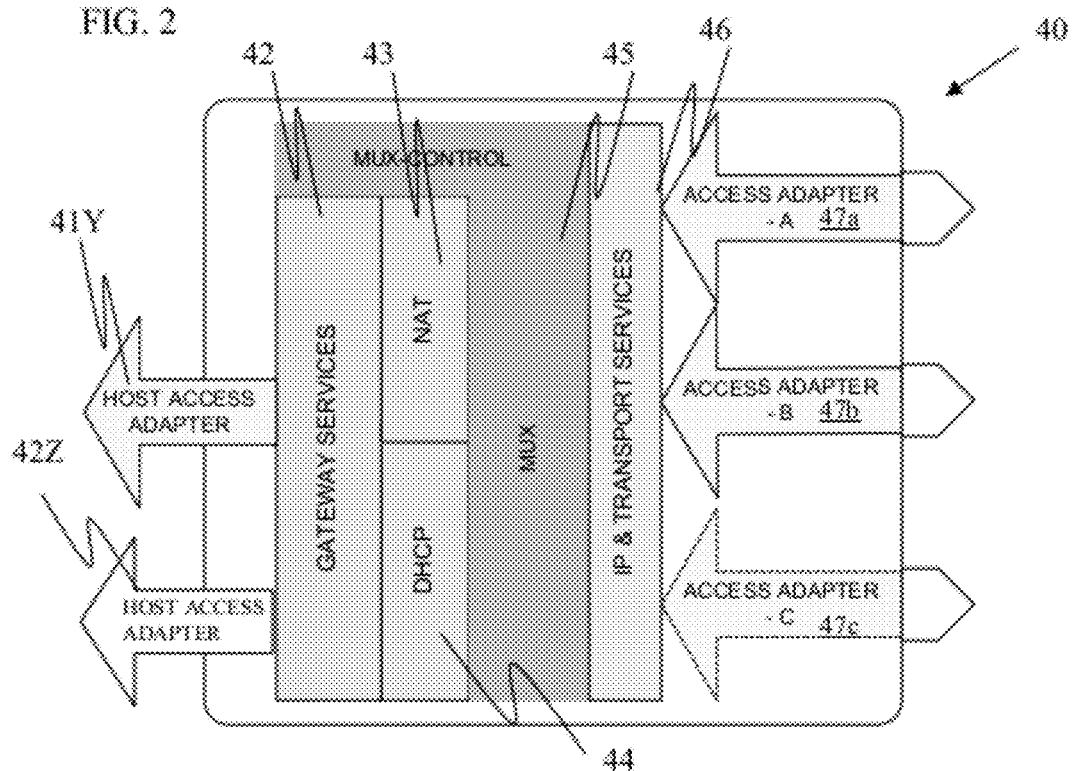
FIG. 2 is a schematic diagram of the logical architecture of a Multi-Access Residential Gateway (MRG) in accordance with an embodiment.

FIG. 2 illustrates the logical architecture of MRG 40. Host access adapter 41Y serves as the physical, transport and link layer required for connectivity to the host system, such as host computer 50 of FIG. 1 or another computing device. For example, Host access adapter 41Y can be an Ethernet card, or other interface defining a port. Dynamic Host Control Protocol (DHCP) can be running on this port. As shown at 41Z, there may be more than one port for connectivity to additional host computing devices. Gateway services layer 42 consists of the essential gateway services like bridging or routing, as is well known. Gateway services layer 42 can work as a proxy gateway, i.e. it will pass a request for a URL from a browser running on host computer 50 to a web server and return the results. The proxy gateway provides clients, such as host computer 50, that are isolated from the Internet a trusted agent that can access the Internet on their behalf. The proxy gateway can act as a barrier to malicious threats and may also be used to hide the IP addresses of host computer 50.

Network Address Translation (NAT) layer 43 serves to modify network address information in datagram (IP) packet headers for the purpose of remapping one IP address space into another. For example, NAT layer 43 can accomplish "network masquerading" (or IP masquerading) which is a technique that hides private network IP addresses, behind a single IP address in a public address space. This mechanism is implemented in a routing device that uses stateful translation tables to map the "hidden" addresses into a single IP address and readdresses the outgoing Internet Protocol (IP) packets on exit so that they appear to originate from the router. In the reverse communications path, responses are mapped back to the originating IP address using the rules ("state") stored in the translation tables.

DHCP layer 44 maintains the DHCP client and server service to attached hosts, such as host computer 50, and NAT services linking via MUX control layer 45 (described below) to one or more of access adapters 47a, 47b, and 47c and provides services to access adapters 47a, 47b, and 47c to establish and maintain Internet Connectivity (e.g., tunnel establishment).

Access adapters 47a, 47b, and 47c are the physical layer required for connectivity to the service provider. Different access adapters are to be used as per the transport technology of the corresponding channel as is well known. For example, access adapters 47a, 47b, and 47c can provide known physical and logical interfaces to ISP 10, ISP 20, and ISP 30 (see FIG. 1), respectively. IP and transport services layer 46 are well known and provide end-to-end communication services for applications within an architecture of network components and protocols. IP and transport services layer 46 provides end-to-end communication services for applications within a layered architecture of network components and protocols. The transport layer provides convenient services such as connection-oriented data stream support and flow control.

MUX control layer 45 controls decisions as to which one (s) of access adapters 47a, 47b, and 47c and host adapters 41Y and 41Z are to be used for the data traffic. Details of MUX control layer 45 are described below. Note that MUX control layer 45 is capable of both multiplexing functions, i.e. mixing multiple flows of data into a single channel, and demultiplexing functions, i.e. separating data flows from a mixed flow into multiple channels. MUX control layer 45 can operate in two modes, an 'application-level' multiplexing/demultiplexing mode and a 'transport-level' multiplexing/demultiplexing mode. In either mode, multiplexing/demultiplexing achieves goals such as bandwidth aggregation and redundancy. No packet re-ordering or loss has to occur because of multiplexing/demultiplexing. Also, there need not be any change to the application layer and the expected transportation API behavior if the destination server is capable of multi-stream or multipath TCP flows. For example, the server can use Multi-path TCP Protocol. The difference between the two multiplexing/demultiplexing modes is in the way upstream data traffic emanating from the host computer 50, or other computing device, is handled.

In application level multiplexing, the upstream traffic can be subdivided in accordance with flow parameters and sent out of primary and/or secondary access adapters. In this mode, the primary access adapter is the adapter of the outgoing connection which is more reliable, permanent and offers higher bandwidth and/or service level. The return traffic for the given flow will be received on the same incoming interface. The distribution of the outgoing traffic to each of the separate access adapters is controlled by logic which will tend to maximize utilization of the primary access adapter interface based on data parameters such as available bandwidth, type of data, time of day, and destination URL. As an example if the user traffic is destined for a video-streaming URL, the primary access adapter will be used, whereas all the email client requests, or other relatively low bandwidth communications, may be routed through secondary channels of lower bandwidth, thus utilizing both access adapters efficiently. Various routing rules and data parameters can be applied.

In transport level multiplexing, a single data traffic flow is subdivided into multiple sub-flows and spread to different access adapters at the transport layer. As this sub-division takes place at IP and transport services layer 46, a single traffic flow can be split to multiple sub-flows at the IP and transport services layer 46 and some or all of the access adapters can be utilized. Of course, there can be a counterpart at the destination server that aggregates the multiple sub-flows in a known manner.

Figure 3:
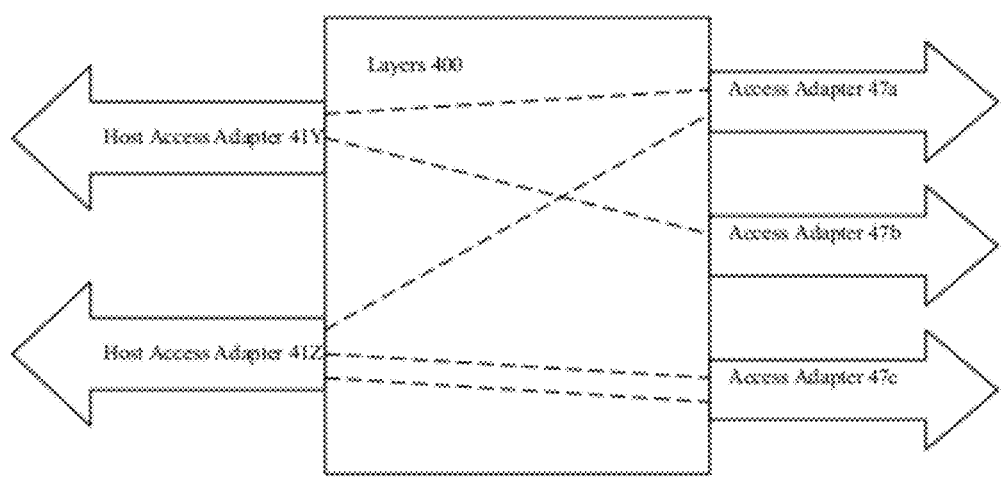
FIG. 3 is a schematic representation of data paths through the embodiment.

FIG. 3 schematically represents data paths through MRG 40. In FIG. 3, the various layers described in FIG. 2. are shown as layers 400 for the sake of simplicity. The example in FIG. 3 includes two host access adapters 41Y and 41Z and three access adapters 47a, 47b, and 47c. Of course, each host adaptor can have a corresponding host computer device. Of course, there can be any number of host access adapters, depending on the number of host devices, and any number of access adapters, depending on the number of connection channels. The dotted lines in FIG. 3 represent data connections to/from the host computers and the data channels. It can be seen that, in this example, there are two connections generated by host device 41Y and three connections generated by host device 41Z. Of the two connections generated by host device 41Y one is multiplexed/demultiplexed to be directed through access adapter 47a and one is multiplexed/demultiplexed to be directed through access adapter 47b. Of the three connections generated by host device 41Z, one is multiplexed/demultiplexed to be directed through access adapter 47a and two are multiplexed/demultiplexed to be directed through access adapter 47c. This example is intended to be illustrative of how MRG 40 can "mix and match" data channels to achieve optimum results.

Wired access channels may include, but are not limited to, Ethernet (Copper/Fiber), DSL, Cable, 3G, LTE and WiMax. Wireless access media technologies may include, but are not limited to Wi-Fi 802.11a/b/g/n, 802.16. The connectivity options may be enabled through independent interfaces, such as USB ports. On the Host side the computing device may have Ethernet connectivity and/or wireless connectivity, or other connective interfaces and protocols. The embodiments may be applied to various services, such as data, voice, video, and the like. Additionally other services, such as firewalls, security, and web-services can be implemented by the embodiments.

MRG 40 can provide link bandwidth aggregation using more than one mechanism like application level flow switching or transport level flow switching. Application level flow switching will tend to diversify multiple traffic conversations across multiple links. Transport level flow switching will tend to diversify the single user conversation across multiple transport layer sub-connections. The embodiments may also employ new protocols, such as MPTCP, when feasible and/or required to achieve bandwidth aggregation. Link redundancy may be available and used as a feature of bandwidth aggregation or deployed separately.

MRA 40 may also include provisions for intelligent traffic switching across multiple links depending upon time-of-day (TOD) and other provision to reduce the cost of usage or increase effectiveness based on various rules that can take into account configuration, type of traffic and restrictions. MRA 40 can be provided with a user interface that will let the users program and define policies/rules to utilize the gateway in the most effective manner. MRA 40 can provide other advanced features such as performance monitoring, interference monitoring and diagnostics.

The embodiments disclosed above may be implemented with software executed on hardware, for example, the various layers can be implemented as functional software modules executed on computing devices such as a router having a processor that executes software instructions. The layers have been segregated by function for the purpose of description. However, the hardware and software implementing the layers can be segregated or combined in any manner to achieve the desired functions. Embodiments have been disclosed herein. However, various modifications can be made without departing from the scope of the embodiments as defined by the appended claims and legal equivalents.

What is claimed:

1. A communications gateway for managing two or more computer network communications channels provided by different service providers, the gateway comprising:
  a first access adapter corresponding to a network communications channel from a first service provider that provides a first type of data connection;
  a second access adapter corresponding to a network communications channel from a second service provider that provides a second type of data connection, the second type of data connection being different than the first type of data connection;
  a third access adapter corresponding to a network communications channel from a third service provider that provides a third type of data connection, the third type of data connection being different than the first and second types of data connection;
  a multiplexer coupled downstream to the first, second and third access adapters and configured to multiplex and demultiplex data traffic on the network communications channels, the multiplexer being configured to subdivide a single data flow into multiple sub-flows and direct the sub-flows to different ones of the first, second and third access adapters;
  a first data path, a second data path, a third data path, a fourth data path, and a fifth data path;
  a gateway services layer coupled downstream to the multiplexer;
  a first host access adapter coupled downstream to the gateway services layer, the first host access adapter being configured to be coupled to a computer device for communication over a network; and
  a second host access adapter coupled downstream to the gateway services layer, the second host access adapter being configured to be coupled to a second computer device for communication over a network,
  the first data path connecting the first host access adapter to the first access adapter, the second data path connecting the second host access adapter to the first access adapter, the third data path connecting the first host access adapter to the second access adapter, the fourth data path connecting the second host access adapter to the third access adapter, and the fifth data path connecting the second host access adapter to the third access adapter.

2. The communications gateway of claim 1, wherein each computer device is a residential user computer.

3. The communications gateway of claim 2, wherein each network communication channel comprises at least one of Digital Subscriber Line (DSL) internet, cable internet, and wireless media.

4. The communications gateway of claim 1, wherein said multiplexer is configured to subdivide upstream data traffic to be transmitted into said first, second and third access adapters based on transmission parameters.

5. The communication gateway of claim 1, wherein said multiplexer is configured to multiplex data traffic based on a rule.

6. The communications gateway of claim 5, wherein the rule includes at least one data parameter as a variable.

7. The communications gateway of claim 1, further comprising:
a network address translation layer coupled to the multiplexer, the network address translation layer being configured to modify network address information in datagram packet headers; and
a dynamic host control protocol layer coupled to the multiplexer, the dynamic host control protocol layer being configured to maintain a dynamic host control protocol client and server service attached to host computers.

8. The communications gateway of claim 1, wherein the multiplexer is configured to operate in an application-level multiplexing/demultiplexing mode and a transport-level multiplexing/demultiplexing mode, wherein in the application-level multiplexing/demultiplexing mode upstream traffic is subdivided in accordance with flow parameters and sent out at least one of the access adapters, and wherein in the transport-level multiplexing/demultiplexing mode a single data traffic flow is subdivided into multiple sub-flows and spread to different ones of the host access adapters.

9. The communications gateway of claim 1, wherein the first type of data connection is a Digital Subscriber Line (DSL) and the second type of data connection is a wireless local area network.

10. The communications gateway of claim 1, wherein different connectivity options are employed depending upon at least one of rate-plan, time-of-day and user-application service level requirements.

11. A method for managing two or more computer network communications channels provided by different service providers, the method comprising:
receiving data packets from at least a first host adapter and a second host adapter, the first host adapter being configured to be coupled to a corresponding first user computer device for communication over a network, the second host adapter being configured to be coupled to a corresponding second user computer device for communication over a network; and
multiplexing and demultiplexing, by a multiplexer, the received data packets over at least first, second, and third access adapters, the multiplexing comprising subdividing a single data flow into multiple sub-flows and directing the sub-flows to different ones of the first, second, and third access adapters, the first access adapter corresponding to a network communications channel from a first service provider that provides a first type of data connection, the second access adapter corresponding to a network communications channel from a second service provider that provides a second type of data connection, the second type of data connection being different than the first type of data connection, the third access adapter corresponding to a network communications channel from a third service provider that provides a third type of data connection, the third type of data connection being different than the first and second types of data connection, the multiplexer being coupled downstream to the first, second and third access adapters, the first and second host adapters being coupled downstream to the multiplexer,
wherein a first data path connects the first host access adapter to the first access adapter, a second data path connects the second host access adapter to the first access adapter, a third data path connects the first host access adapter to the second access adapter, a fourth data path connects the second host access adapter to the third access adapter, and a fifth data path connects the second host access adapter to the third access adapter.

12. The method of claim 11, wherein the corresponding first and second user computer devices are each a residential user computer.

13. The method of claim 12, wherein each network communication channel comprises at least one of Digital Subscriber Line (DSL) internet, cable internet, and wireless media.

14. The method of claim 11, wherein said step of multiplexing comprises subdividing upstream data traffic to be transmitted into said first, second and third access adapters based on transmission parameters.

15. The method of claim 11, wherein said multiplexing step comprises multiplexing data traffic based on a rule.

16. The method of claim 15 wherein the rule includes at least one data parameter as a variable.

17. A non-transitory tangible computer readable media having instructions recorded thereon, said instructions, when executed by a processor performs a method for managing two or more computer network communications channels provided by different service providers, the method comprising:
receiving data packets from at least at least a first host adapter and a second host adapter, the first host adapter being configured to be coupled to a first user computer device for communication over a network, the second host adapter being configured to be coupled to a second user computer device for communication over a network;
multiplexing and demultiplexing, by a multiplexer, the received data packets over first, second, and third access adapters, the multiplexing comprises subdividing a single data flow into multiple sub-flows and directing the sub-flows to different ones of the over first, second, and third access adapters, the first access adapter corresponding to a network communications channel from a first service provider that provides a first type of data connection, the second access adapter corresponding to a network communications channel from a second service provider that provides a second type of data connection, the second type of data connection being different than the first type of data connection, the third access adapter corresponding to a network communications channel from a third service provider that provides a third type of data connection, the third type of data connection being different than the first and second types of data connection, the multiplexer being coupled downstream to the first, second and third access adapters, the first and second host adapters being coupled downstream to the multiplexer, wherein a first data path connects the first host access adapter to the first access adapter, a second data path connects the second host access adapter to the first access adapter, a third data path connects the first host access adapter to the second access adapter, a fourth data path connects the second host access adapter to the third access adapter, and a fifth data path connects the second host access adapter to the third access adapter.

18. The media of claim 17, wherein each user computer device is a residential user computer.

19. The media of claim 18, wherein each network communication channel comprises at least one of Digital Subscriber Line (DSL) internet, cable internet, and wireless media.

20. The media of claim 17, wherein said step of multiplexing comprises subdividing upstream data traffic to be transmitted into said first, second and third access adapters based on transmission parameters.

21. The media of claim 17, wherein said multiplexing step comprises multiplexing data traffic based on a rule.

22. The media of claim 21 wherein the rule includes at least one data parameter as a variable.

* * * * *